United States Patent

[11] 3,528,343

[72] Inventor Walter A. Sherwood
 Hempstead, New York
[21] Appl. No. 823,824
[22] Filed May 12, 1969
 Continuation-in-part of Ser. No. 776,490,
 Nov. 18, 1968, pending.
[45] Patented Sept. 15, 1970
[73] Assignee Lourdes Industries, Inc.
 Farmingdale, New York
 a corporation of New York

[54] HYDRAULIC CYLINDER AND PISTON LOCK
 9 Claims, 1 Drawing Fig.
[52] U.S. Cl. .................................................. 92/28,
 188/67, 188/170
[51] Int. Cl. ............................................. F15b 15/26,
 F16d 65/24
[50] Field of Search ................................. 92/23, 28,
 27, 24, 18, 26, 165; 188/170, 67

[56] References Cited
 UNITED STATES PATENTS

| | | | |
|---|---|---|---|
| 2,348,764 | 5/1944 | Thomas | 92/28X |
| 2,632,425 | 3/1953 | Grover | 92/28 |
| 2,808,903 | 10/1957 | Kovac | 188/67 |
| 3,009,747 | 11/1961 | Pitzer | 188/67X |
| 3,176,590 | 4/1965 | Uhtenwoldt et al. | 92/28X |
| 3,203,513 | 8/1965 | Allen | 188/170 |
| 3,353,455 | 11/1967 | Berry | 92/27X |
| 3,429,233 | 2/1969 | Wright | 92/27X |

Primary Examiner—Martin P. Schwadron
Assistant Examiner—Leslie J. Payne
Attorney—Nolte and Nolte ABSTRACT: A hydraulic cylinder and piston designed to move a load to a desired position and to lock in that position until released, even though fluid pressure to the cylinder may be interrupted, the locking being effected by the frictional engagement of one or more collets with the piston rod under the influence of one or more spring-biased collet closure rings, with the added provision of one or more protective devices designed to prevent communication to the rings and collets of compressive loads in excess of a predetermined maximum.

Patented Sept. 15, 1970
3,528,343
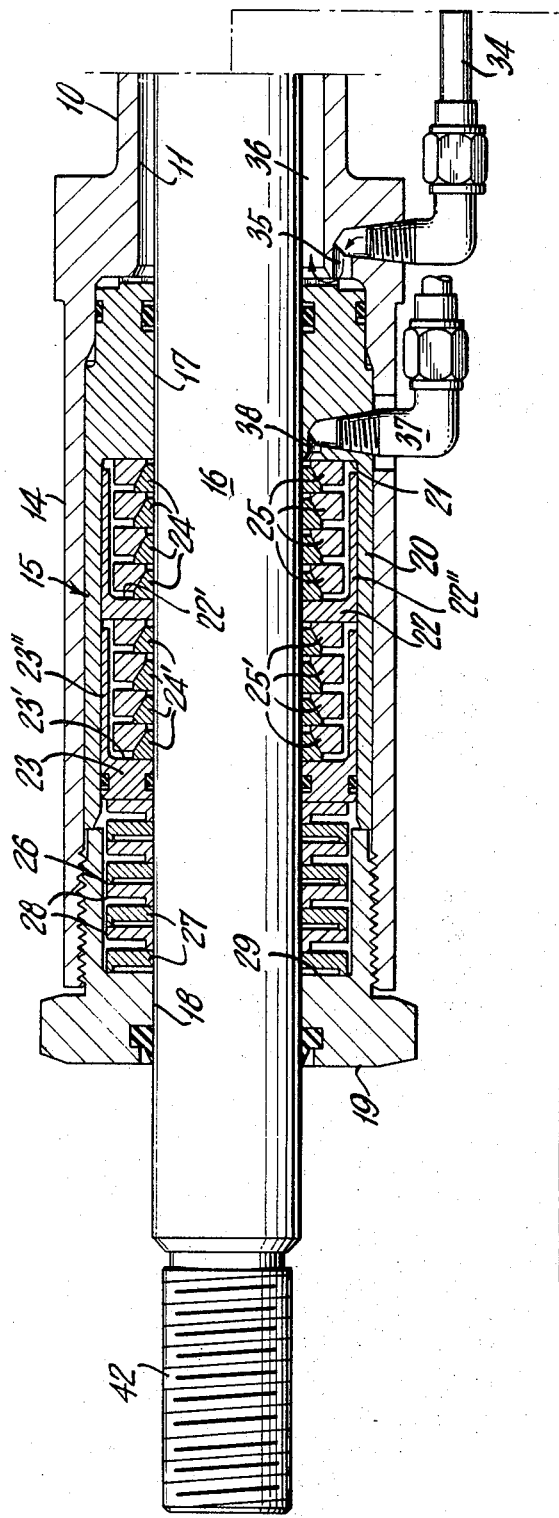
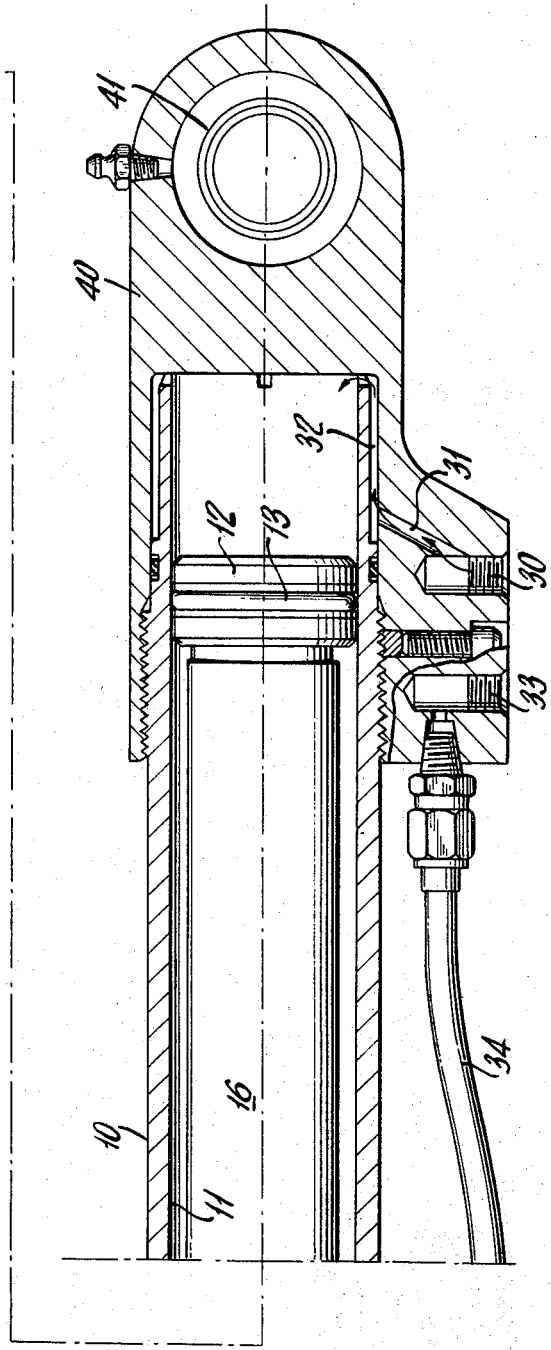
INVENTOR
WALTER A. SHERWOOD
BY
Nolte & Nolte
ATTORNEYS

HYDRAULIC CYLINDER AND PISTON LOCK

This application is a continuation-in-part of copending application Ser. No. 776,490, filed November 18, 1968.

There are many mechanical devices wherein one part is moved to different selected positions with respect to another part by the interposition and actuation of a hydraulic cylinder and piston. The parts may be held in their adjusted positions by rigidly maintaining the required pressure, or by means of a mechanical lock of some sort, the latter expedient frequently involving complex and/or not consistently reliable combinations of parts. The lock disclosed in application Ser. No. 776,490 constitutes a simple, compact and highly reliable solution to this problem and the mechanism disclosed herein constitutes a desirable improvement on said lock.

A practical embodiment of the invention is shown in the accompanying drawing, the single figure representing an axial sectional view of a cylinder and piston provided with unidirectional locking means and over-load protective means, the drawing being broken as indicated to show on a sufficiently large scale the elements of the normally elongated assembly.

Referring to the drawing, the cylinder 10 has a bore 11 in which the piston 12 is slidable, the piston being provided with sealing means 13 to prevent leakage of hydraulic fluid past the piston head. The cylinder is extended to form a cylindrical casing 14 in which the locking assembly 15 is housed and the piston rod 16 extends axially from the cylinder 10 through a sealed opening 17 in one end of the locking assembly, through said assembly and out through a sealed opening 18 in the end cap 19.

The locking assembly 15 is shown as comprising the collet retainer 20 having an annular end wall 21 and cylindrical inner surface, a cup-shaped spacer 22, a similarly shaped unlock cup 23, and a plurality (four of each being shown) of collets 24, 24' and collet compression rings 25, 25' surrounding the piston rod 16 within the spacer 22 and cup 23. Each collet is formed with a beveled outer surface facing in the direction of the anticipated force to be resisted and each ring is formed with a complementary inner beveled surface. The end collet 24 in the spacer 22 contacts the annular wall 22' of said spacer, and the ring 25 at the opposite end rests against the wall 21 of the retainer 20. Similarly, the end collet 24' in the cup 23 contacts the annular wall 23' of said cup and the ring 25' at the opposite end rests against the adjacent end surface of the spacer 22.

The collets and rings are biased toward locking position by the compression spring 26, shown here as being constituted by a series of alternately disposed shallow flanged cups 27 and flanged discs 28, the flange of the outermost cup bearing against the inner annular wall 29 of the end cap 19 and the innermost disc resting against the unlock cup 23. The end cap 19 is screwed into the casing 14 to a point where it bears against the edge of the locking assembly housing and places the spring 26 under some compression. The spring 26 could be in the form of a coil spring, but the cup and disc combination is considered particularly suitable for the requirements of the present mechanism.

For actuation of the piston in the "extend" direction hydraulic fluid from a suitable source (not shown) is admitted through the inlet port 30, passage 31 and annular cylindrical space 32 to the inner end of the cylinder, driving the piston rod outward (to the left in the drawing) as far as desired. Movement in the "retract" direction is effected by admitting fluid through the inlet port 33, tube 34 and passage 35 to the space 36 in the cylinder under the piston head.

The locking assembly acts to prevent movement in the "retract" direction, as explained in detail in copending application Ser. No. 776,490, in that the spring 26 compresses the collets and rings so that their engaging beveled surfaces force the collets into frictional engagement with the piston rod. As each collet, starting with the left-most one in the drawing, engages the piston rod the retracting force of the rod is added to the spring pressure, causing the next collet in the series to grip the rod more tightly, and the piston can thus be locked against movement under very high loads with negligible—or accurately determinable actual movement.

Since resistance to an abnormally high load could cause permanent deformation of one or more of the compression rings and possibly also of the collets, it is desirable to protect the parts against such damage, as provided herein. The skirt portion 22" of the spacer 22 is of such a depth that its edge will bear against the wall 21 of the retainer 20 when the collets 24 and rings 25 have been compressed to a degree within their elastic tolerance (i.e., without permanent deformation) and the skirt portion 23" of the unlock cup 23 is likewise proportioned to bear against the spacer 22 when the collets 24' and rings 25' have been compressed to a degree within their elastic tolerance.

To unlock the piston rod, for retraction as desired, hydraulic fluid is admitted through the port 37 and passage 38 to the space between wall 21 and the adjacent collet and ring. The unlocking fluid passes within and around the spacer 22 (which does not fit tightly in the locking assembly housing) and forces the unlock cup 23 in the direction to compress the spring 26 and effectively relieve pressure on the rings and collets, thus leaving the piston rod free to move in either direction as determined by fluid admitted through ports 30 or 33.

For attachment to relatively movable parts of a machine, or the like, the cylinder head 40 is shown as being provided with a journal 41 in which a shaft may be received, and the end of the piston rod is threaded at 42 for engagement in or mounting on another part.

When the spacer 22 has bottomed on the wall 21 the collets 24 and rings 25 can no longer be subjected to the cascading effect of forces exerted by the collets 24' and rings 25' in the cup 23. More or fewer pairs of collets and rings may be provided in each group (within a spacer or cup), and a single group or more than two groups, as shown, may be used according to the requirements of each installation.

As noted above, the locking mechanism shown is designed for one-way operation, permitting comparatively free extension of the piston rod but locking against retraction, until released. Locking in both directions can be effected by the provision of a casing 14 long enough to accommodate a second locking assembly 15 with the parts reversed. Such two-way locking is fully disclosed in application Ser. No. 776,490.

I claim:

1. A shaft slidable through a housing to selected adjusted positions with respect to said housing in combination with releasable locking means adapted to hold the shaft in each adjusted position against an applied axial load comprising, a fixed abutment within the housing, a plurality of collets bearing against the shaft, each collet having at least one beveled outer surface, at least one compression ring having a beveled inner surface complementary to and bearing against the beveled outer surface of an adjacent collet, resilient means biased to urge said collets and ring toward said abutment and into shaft-locking positions, the collet nearest said drive means engaging tightly with the shaft and transmitting additional locking force from the shaft to an adjacent collet, unlocking means adapted to be actuated to counteract the bias of said resilient means, and protective means adapted to assume any increment of an applied axial load in excess of a predetermined maximum within the elastic limits of the collets and ring.

2. The shaft locking combination according to claim 1 in which the protective means includes an axially movable part effectively interposed between the resilient means and an adjacent collet or ring and means for arresting movement of said part toward said abutment at a predetermined point.

3. The shaft locking combination according to claim 2 in which the axially movable part is provided with an axially extending portion having an end adapted to bear against the abutment whereby movement of said part toward said abutment is arrested.

4. The shaft locking combination according to claim 1 in which the protective means includes a cup-shaped element having a portion disposed radially of the shaft and a skirt portion extending axially toward the abutment, an end of said skirt portion being adapted to bear against the abutment whereby movement of said element toward said abutment is arrested.

5. The shaft locking combination according to claim 1 which includes a plurality of groups of collets and compression rings, each group comprising a plurality of collets and a plurality of compression rings, and each group being provided with protective means including an axially movable part effectively interposed between the resilient means and an adjacent collet or ring and with means for arresting axial movement of said part at a predetermined point.

6. The shaft locking combination according to claim 5 in which each axially movable part is provided with an axially extending portion having an end adapted to arrest axial movement of said part.

7. The shaft locking combination according to claim 1 which includes a piston and a cylinder in which the piston is slidable, the shaft being constituted by the piston rod and the cylinder being axially extended to constitute the housing, the locking means being contained in said housing.

8. The shaft locking combination according to claim 1 in which the unlocking means includes a hydraulic system adapted to compress said resilient means.

9. The shaft locking combination according to claim 7 which includes hydraulic means adapted to move said piston in said cylinder.